May 29, 1928.  1,671,567

A. E. BANNISTER

RECOIL CONTROL DEVICE

Filed March 12, 1926

Inventor

Alfred E. Bannister,

By

Attorneys

Patented May 29, 1928.

1,671,567

UNITED STATES PATENT OFFICE.

ALFRED E. BANNISTER, OF DULUTH, MINNESOTA.

RECOIL-CONTROL DEVICE.

Application filed March 12, 1926. Serial No. 94,118.

This invention relates to recoil control of the hydraulic type wherein oil or other liquid is used as a cushioning or retardation agent. The recoil control may be used as a shock absorber for motor vehicles and special pleasure vehicles using springs, pneumatic tires and other devices to add to the comfort of present-day automobile riding. In this type of vehicle a shock absorber is ordinarily interposed between a vehicle frame and axle or spring carried thereby and yieldably supporting the frame, in which instance, the frame may be considered as a movable member and the axle as a stationary member. Under road shock conditions the frame or movable member is depressed or shifted towards the axle or stationary member with such movement meeting with resistance by the springs supporting the frame or movable member relative to the axle or stationary member. Naturally there is a recoil of frame or movable member which is very often a jerky up-throw of the frame, even above normal position of the same and often results in a series of quick short vibrations which detract from the easy riding qualities of the automobile. This is just an example of a use of my recoil controlling device and when hereinafter considering it in connection with movable and immovable or stationary members, it is to be understood that such terms are used in a broad sense, and said members applicable to various structures.

My invention aims to provide a recoil control device that is mounted on a movable member, and flexibly connected to a stationary member. In the recoil control device is somewhat of a dash pot using oil or other liquid as a cushioning agent and the arrangement of the dash pot is such that all parts thereof are immersed in the oil or liquid and lubricates thereby. Ordinarily, a dash pot for recoil or absorbing purposes has an adjustable valve or restricted passage for oil and the flow or velocity of the oil in the dash pot ordinarily determines the cushioning or retarding effect of the recoil or shock absorbing device. By experience I have found that when a dash pot valve is set for one recoil or retard condition it may not meet the requirements for another condition, so I have designed a dash pot valve which is automatic in its operations. I have also found that when using any liquid in a dash pot or compression chamber that air enters the compression chamber and is often trapped therein and unless some provision is made to eliminate the body of air the recoil control device cannot be accurately set to take care of a prescribed recoil condition.

My invention in its broadest aspect, involves a principle of automatic proportional control of two elements that may be movable with respect to each other or one element movable relative to a comparatively stationary element. The control is attained by a compression chamber having a valved outlet constructively arranged to be governed by the movable element or the state of compression induced by said movable element. The valved outlet constitutes means conditioned by the elements separating for proportionally controlling the movement of the elements in moving towards each other, and considering this control in connection with a compression chamber, said means is inactive under a no compression or neutral condition of the compression chamber, conditioned by charging of the compression chamber, and active during discharge of the compression to control the discharge in proportion to the degree of compression.

My invention further aims to provide a recoil device including a compression chamber wherein the constructive arrangement of parts eliminate pockets in which air is trapped. Contributing to this result is a valved outlet passage located at the highest point in the compression chamber and the valve which controls the passage is supported so that it will be opened to insure a complete exhaust of air from the chamber.

My invention is further characterized by a durable built-in device that will be hereinafter specifically described and then claimed.

Reference will now be had to the drawing, wherein

Figures 1, 2:
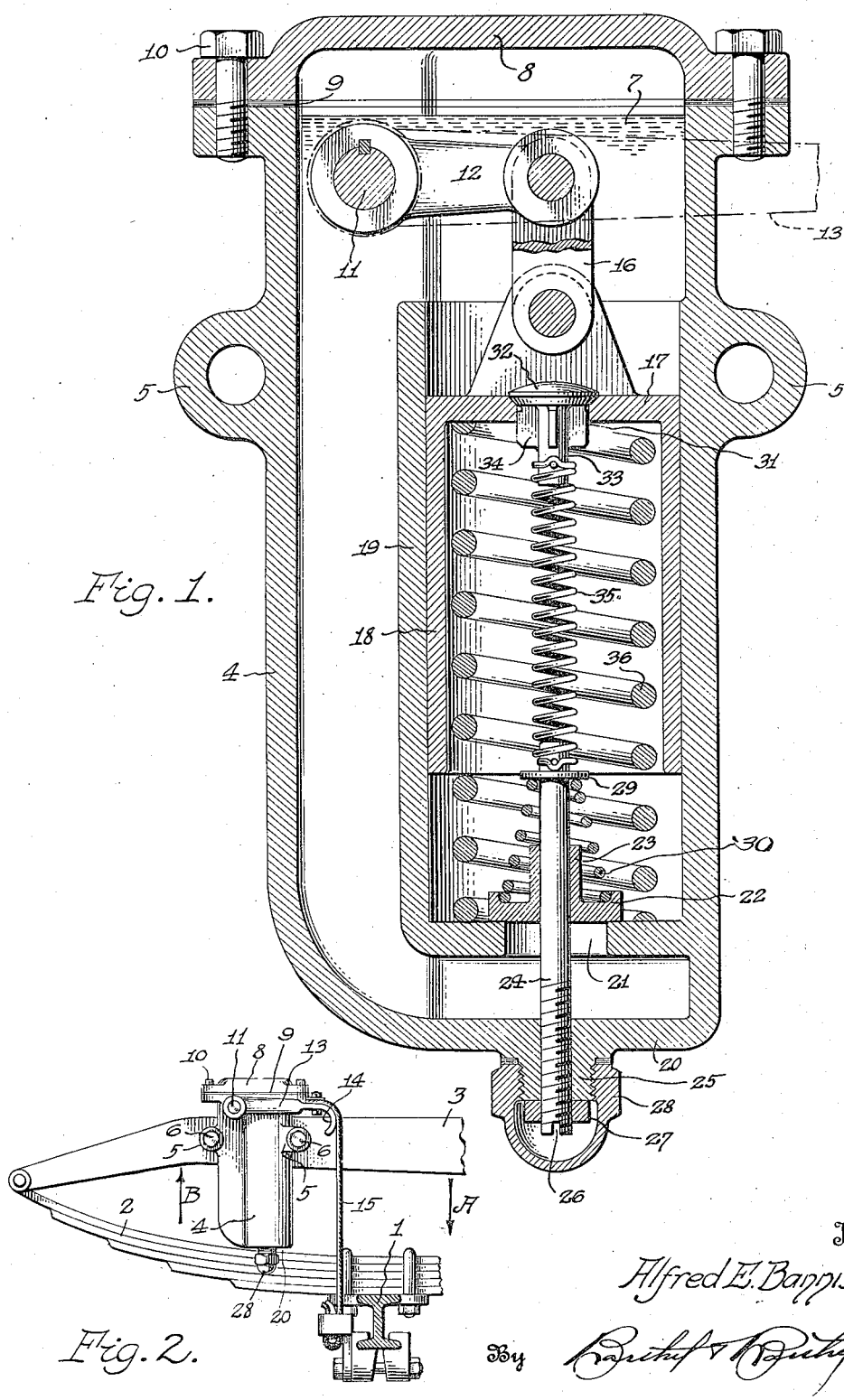
Figure 1 is a longitudinal sectional view of the shock absorbing device.
Fig. 2 is a side elevation of the same, showing by the way of example, its use as a shock absorber for a vehicle.

Considering Fig. 2 the reference numeral 1 denotes an axle or stationary member provided with a laminated spring 2 yieldably supporting a chassis frame or movable member 3, which under load and shock conditions may be depressed in the direction of arrow A to rebound in the direction of the arrow B.

The shock absorbing device comprises a liquid container or reservoir 4 having apertured ears 5 by which it may be connected to the chassis frame 3 by screw bolts 6 or other fastening means. The container or reservoir is adapted to be substantially filled with oil 7 or other liquid and the upper open end of the container is closed by a cap 8 and a gasket 9 held in place by screw bolts 10 or other fastening means.

Journaled in the upper part of the container 4 and extending transversely thereof is a rock shaft 11 having an inner crank 12 and an outer crank 13. The outer crank 13 is of greater length than the inner crank for leverage purposes and as such takes the form of a lever having a curved extremity or shoe 14 to which is attached a strap or flexible member 15 having its lower end permanently connected to the axle 1 or some stationary element in proximity thereto. Obviously, in some forms of the recoil device, a connecting rod with universal joints could be advantageously used.

Operatively connected to the inner crank 12 by a link 16 is the upper end 17 of a piston 18, said piston being slidable in the upper open end of a cylinder 19 forming an integral part of the container 4. The cylinder 19 cooperates with the piston 18 in forming a compression chamber and the lower end of the cylinder 19 is in spaced relation to the bottom wall 20 of the container 4 and has an inlet opening 21 normally closed by a check valve 22 which has a sleeve portion 23 slidable on a spring regulating stem 24 extending through the opening 21 into the bottom wall 20 of the cylinder and a boss 25 of said wall. The stem 24 is screwed into the wall 20 and the boss 25 thereof with the outer end of the stem provided with a slot 26 so that a screw driver or other tool may be conveniently used for adjusting the spring regulating stem 24. A jam nut 27 may be mounted upon the stem 24 against the boss 25 and a cap nut 28 may be screwed on the boss 25 to prevent leakage of any oil from the container 4 about the stem 24.

The upper end of the stem 24 has a spring abutment 29 for a conical helical expansion spring 30 seated in the check valve 22 to hold said valve normally closed, yet permit of said valve opening to admit oil to the cylinder 19 from the container 4.

The upper end 17 of the piston 18 has a central opening 31 normally closed by a check valve 32 seated on the piston and adapted to open outwardly therefrom, said valve having a stem 33 provided with wings 34 guiding the movement of the valve relative to the opening 31. The inner end of the stem 33 is connected to the end convolution of a coiled retractile spring 35 which has its other end convolution connected to the upper end of the regulating stem 24. The spring 35 is calibrated and selected for a predetermined duty compared to a neutral or zero position of the piston 18, shown in Fig. 1, and the tension or retractile force of the spring 35 is nil or zero during such neutral position of the piston; the check valve 32 resting on its piston seat.

In the piston 18 and the cylinder 19 is a large coiled spring 36 and this spring is employed to hold the strap or flexible member 15 normally taut, with the piston 18 at any position.

In other forms of my recoil device, various types of springs may be substituted for the coiled springs 30, 35 and 36.

Assuming that the recoil or shock absorbing device has its container 4 properly filled with oil, which is also in the cylinder 19, and properly regulated for a desired recoil or road condition, depression of the movable member 3 in the direction of the arrow A causes the container and its cylinder to be lowered and the piston 18 raised. As the piston 18 is raised above the normal position the retractile force of the spring 35 is increased proportionately or for a predetermined duty, and firmly holds the piston check valve 32 seated. Oil is forced out of the upper open end of the cylinder 19 by the piston 18 and because of such displacement and a reduction of atmospheric pressure in the lower end of the cylinder 19, the cylinder check valve 22 is unseated admitting oil to the lower end of the cylinder 19. The spring 30 does not materially resist opening of the check valve 22, but simply prevents accidental shifting of the valve.

On the rebound of the movable member 3 in the direction of the arrow B of Fig. 2, the container and its cylinder are raised and the piston 18 lowered. Obviously the cylinder check valve 22 is closed and the oil within the cylinder attempts to unseat the piston check valve 32, under the influence of the conditioned spring 35, so that the oil may enter the upper part of the cylinder 19 of the container 4. Unseating of the piston check valve 32, at the initial lower movement of the piston 18, is resisted by the spring 35 being under maximum tension, consequently compression is built up in the compression chamber and the rebound of the movable member is gradual, without any short jerky movement, because the chassis spring recoil may be as completely absorbed as desired. The piston check valve being held by the spring 35 provides a maximum restriction for the outflow of oil at top dead center, but as the piston 18 continues to move towards neutral or zero position, the retractile force of the spring 35 is expended and as the piston moves below normal position, the spring unseats the piston check valve 32, and holds it unseated, consequently the oil discharges freely. This takes place to equalize conditions, avoid retardation, and when the piston reaches neutral position by the movable member assuming neutral position relative to the stationary member, the piston valve is about seated.

It will be noted that the link connection 16 constitutes an abutment to define an extreme open position of the check valve 32.

From the foregoing it will be observed that I have a novel check valve arrangement for the piston and cylinder with the valve of the piston automatic in its action to regulate the discharge of oil from the piston, and this is in contradistinction to a valve which is set or a passage which is provided for a constant flow or velocity of oil from the compression chamber under all conditions. My compensating check valve affords an easy and gradual movement for the movable member relative to the stationary member under all recoil or rebound conditions.

It will be noted that my recoil control device has been considered as though used in a vertical position, but there are many instances where rearrangement of the various elements will permit of the device being used in a horizontal or angular position. In any arrangement, however, it is essential that the discharge valve of the compression chamber be at the highest point in the chamber, so that all air may be driven from the chamber when compression takes place therein. It is also essential that the spring be located to hold the discharge valve or some intermediate valve actuating member in such position that the valve will be held open or without restraint after the piston has passed a predetermined point. On account of there being many arrangements where the principle of my invention may be involved, I desire it to be understood that the device may be substantially duplicated for double acting purposes; that various types of compression chambers and pistons may be used; and that the structural elements herein disclosed are susceptible to such variations and modifications as fall within the scope of the appended claims.

What I claim is:—

1. In a recoil control device connecting a movable member and a comparative stationary member, and wherein a cylinder receives liquid on a downward movement of said movable member and discharges liquid on an upward movement of said movable member;—and wherein a piston is reciprocable in the cylinder incident to movement of said movable member;—means controlling the discharge of liquid from said cylinder, said means comprising a check valve in said piston, a spring in said piston holding said check valve normally closed and having a neutral position relative to said check valve, and means axially of said cylinder adapted for regulating the neutral position of said spring and the action of said check valve.

2. A recoil control device as called for in claim 1, and a check valve slidable on the last mentioned means and controls the admission of liquid to said cylinder.

3. A recoil control device as called for in claim 1, further characterized by a check valve controlling the admission of liquid to said cylinder and the last mentioned means capable of regulating the action of said valve.

4. In a recoil control device wherein a piston is reciprocable in a cylinder containing oil and has a neutral position in the cylinder when the device is inactive, and wherein the admission of oil to the cylinder and the discharge of oil therefrom is adapted to dampen shocks which cause the piston and cylinder to move relative to each other;—a check valve construction for the cylinder and piston, there being a cylinder check valve controlling the admission of oil to the cylinder and a piston check valve controlling the passage of oil from the piston, springs holding said valves approximately closed at a neutral position of the piston, and a regulating mechanism for the springs of said valves, said regulating mechanism extending through the check valve of said cylinder and supporting the spring of the piston valve so that its retractile force is increased approximately in proportion to the distance the piston is above neutral position.

5. In a recoil control device wherein a piston is reciprocable in a cylinder to place fluid under compression and wherein the fluid is admitted to the cylinder and discharged by the piston incident to shocks which cause a relative movement between the cylinder and piston; a check valve for the piston controlling the discharge of fluid from the cylinder and the oil pressure in the compression cylinder, means within the piston holding said check valve approximately closed at a neutral position of said piston and adapted to be stressed by movement of the piston on an intake stroke, to hold said check valve closed and permit of the check valve gradually reducing the compression of fluid to zero when the piston is moved for a discharge stroke approaching neutral position, and means coaxial of the piston and cylinder adapted for regulating the last mentioned means.

6. In a recoil control device wherein a piston is reciprocated in a chamber containing liquid to cause an intake and discharge liquid to and from said chamber;—a valve controlling the discharge of liquid from said chamber, means regulating the action of said valve, said means maintaining said valve approximately closed during neutral position of said piston and approximately proportionately resisting opening of said valve during movement of said piston from neutral position towards the outer end of said piston stroke and its return to neutral position, and permitting opening of said valve during movement of said piston from neutral position towards the inner end of said piston stroke and its return to neutral position.

In testimony whereof I affix my signature.

ALFRED E. BANNISTER.